United States Patent [19]

Ning et al.

[11] 3,900,501

[45] *Aug. 19, 1975

[54] BENZOPHENONE INTERMEDIATES FOR 7-LOWER ALKANOYL BENZODIAZEPINES

[75] Inventors: Robert Ye-Fong Ning, West Caldwell; Leo Henryk Sternbach, Upper Montclair, both of N.J.

[73] Assignee: Hoffmann-La Roche Inc., Nutley, N.J.

[ * ] Notice: The portion of the term of this patent subsequent to Aug. 22, 1989, has been disclaimed.

[22] Filed: Oct. 2, 1972

[21] Appl. No.: 293,967

Related U.S. Application Data

[62] Division of Ser. No. 101,117, Dec. 23, 1970, abandoned.

[52] U.S. Cl. ... 260/340.9; 260/239.3 D; 260/307 D; 260/326 N; 260/340.7; 260/349; 260/558 S; 260/562 N; 260/562 S; 260/562 B; 260/570 AB; 424/244
[51] Int. Cl. ............................................. C07d 13/04
[58] Field of Search ......... 260/562 B, 326 R, 340.6, 260/340.9, 379, 562 N, 326 N, 340.7, 349, 558 S, 562 S

[56] References Cited
UNITED STATES PATENTS 3,513,158  5/1970  Nutley et al. ..................... 260/239.3
3,686,308  8/1972  Ye Fong Ning et al. ........ 260/562 N

FOREIGN PATENTS OR APPLICATIONS 1,305,976  10/1962  France ........................... 260/562 B

OTHER PUBLICATIONS

Fieser et al., "Advanced Organic Chemistry," p. 441 – 443.

Primary Examiner—G. Thomas Todd
Assistant Examiner—M. A. M. Crowder
Attorney, Agent, or Firm—Samuel L. Welt; Bernard S. Leon; Frank P. Hoffman

[57] ABSTRACT

The present invention relates to processes for the preparation of 7-lower alkanoyl-1,4-benzodiazepin-2-ones from the corresponding 7-(cyclic ketal) or 7-(aliphatic ketal)-1,4-benzodiazepin-2-ones. These compounds are useful as muscle relaxants, sedatives and anti-convulsants. The present invention also encompasses novel intermediates useful in the preparation of such 7-lower alkanoyl benzodiazepines, namely, the above 7-ketal-1,4-benzodiazepin-2-ones, which novel intermediates also possess biological activity per se.

8 Claims, No Drawings

BENZOPHENONE INTERMEDIATES FOR 7-LOWER ALKANOYL BENZODIAZEPINES

This a division, of application Ser. No. 101,117 filed Dec. 23, 1970, now abandoned.

DETAILED DESCRIPTION OF THE INVENTION

The present invention relates to a process for preparing 7-lower alkanoyl-1,4-benzodiazepin-2-ones. Such 7-lower alkanoyl-1,4-benzodiazepin-2-ones are of the formula

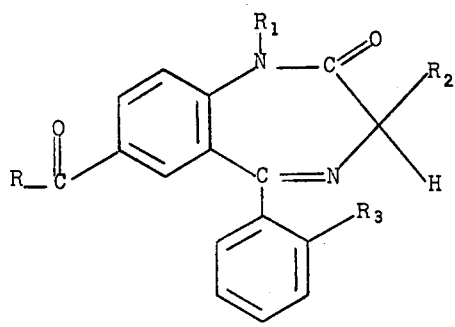

wherein R is selected from the group consisting of hydrogen and lower alkyl;

$R_1$ and $R_2$ are selected from the group consisting of hydrogen and lower alkyl; and $R_3$ is selected from the group consisting of hydrogen and halogen.

The term "lower alkyl" as utilized herein includes both branched and straight chain hydrocarbon groups having 1-7, most preferably 1-4, carbon atoms, in the chain. Representative of these are methyl, ethyl, propyl, isopropyl, butyl and the like. The term "halogen" as utilized throughout the disclosure is intended to connote all four halogens, namely, chlorine, bromine, iodine and fluorine, unless otherwise specified.

The term "lower alkanoyl" as utilized herein represents the acyl moiety of a lower alkanoic acid (including a lower alkyl-CO-grouping in which the lower alkyl group preferably has 1-6, most preferably 1-3 carbon atoms). It also encompasses the acyl moiety of formic acid. Thus, the term as found herein represents groups such as formyl, acetyl, propionyl, butyryl, valeroyl and the like.

A preferred embodiment of the novel process of the present invention can be illustrated diagrammatically in the following flow sheet. In the reaction schemes depicted in this flow sheet, R, $R_2$ and $R_3$ are as described above. $R_7$ and $R_8$ represent any readily removable moiety capable of being removed by suitable hydrolyzing techniques. Preferably, $R_7$ and $R_8$ individually signify lower alkyl and when taken together connote a $-CH_2CH_2-$ grouping or a $-CH_2CH_2CH_2-$ grouping. It is of course to be recognized that the character of the groups designated by $R_7$ and $R_8$ is not critical to the successful performance of the instant process as long as they can be readily hydrolyzed. $R_7$ and $R_8$ combine to function as a protecting group, and insure the preparation of the compounds of the formula I above in high yields. Most preferred for the purposes of the present invention is the grouping when $R_7$ and $R_8$ represent together $-CH_2CH_2-$, i.e., the 1,3-dioxolan-2-yl grouping. X' signifies halogen, preferably, chlorine and bromine. X signifies a group that can be transformed into an amino group, for example.

An azido group or a phthalimido group, or alternatively, a leaving group, for example, halogen such as chloro, bromo or iodo, alkyl- or aryl-sulfonyloxy groups, i.e., mesyloxy, benzenesulfonyloxy and tosyloxy.

Compounds of the formula I are disclosed in application Ser. No. 877,490 filed Nov. 17, 1969 to be issued on Jan. 5, 1971 as U.S. Pat. No. 3,553,206.

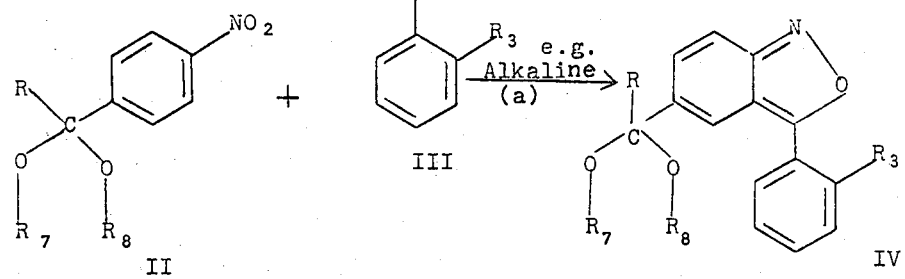

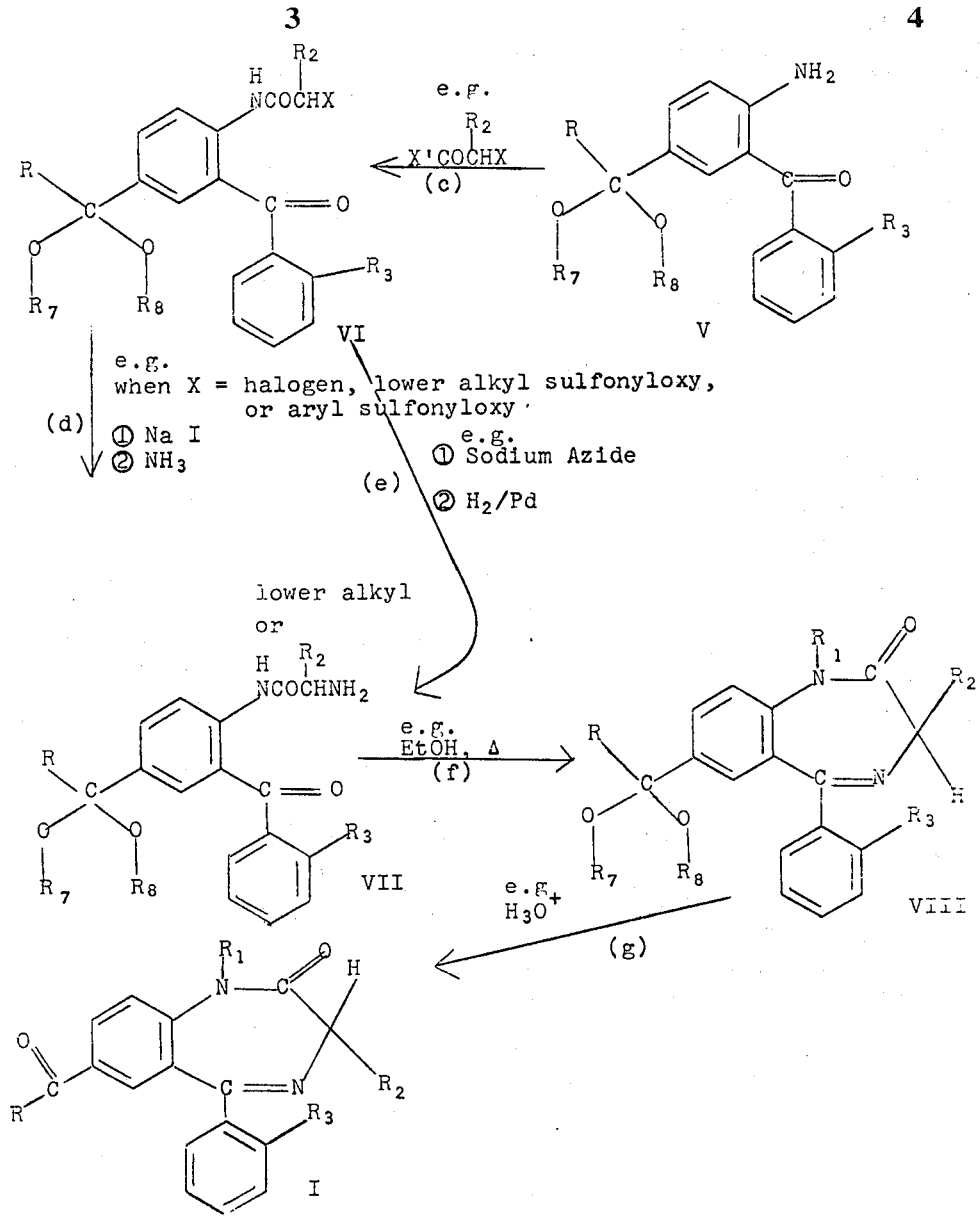

Preferred compounds in the foregoing diagrammatical flow sheet are those wherein $R_2$ is hydrogen. More preferred are those compounds wherein $R_2$ is hydrogen and $R_3$ is selected from the group consisting of hydrogen, chlorine and fluorine, most preferably, fluorine. More preferred are those compounds in the diagrammatical flow sheet wherein $R_1$ is hydrogen or methyl and R is methyl. As is evident, therefore, the preferred class of compounds are those which result in a compound of the formula I wherein R is methyl, $R_2$ is hydrogen and $R_3$ is selected from the group consisting of hydrogen, chlorine, and fluorine, most preferably, fluorine, and $R_1$ is hydrogen and methyl.

Compounds of the formula II above can be prepared in the manner set forth in Gisvold et al., J. Pharm. Sci, 57, 784 (1968).

In the first process step, depicted in the Flow Sheet as step (a), a compound of the formula II is reacted with a compound of the formula III to yield a compound of the formula IV. Process step (a) proceeds, preferably, in the presence of an inert organic solvent. Representative of such solvents are alcohols, for example, lower alkanols such as ethanol and methanol, dimethylsulfoxide and dimethylformamide. Preferred are lower alkanols, particularly, methanol.

It is essential that a base to present during this step and any suitable base may be employed. However, an alkali metal hydroxide such as sodium hydroxide is advantageously utilized during the reaction between compounds of formula II and III to yield a compound of formula IV. For this reaction, it is preferable that the temperature be maintained in the range of from about from about room temperature to about 100°C., most preferably, from about room temperture to about 60°C. The product of the formula IV need not be isolated prior to conversion to a compound of the formula V, but, in a preferred aspect, it is preferably isolated from the reaction mass.

In the second process step, depicted in the Flow Sheet as step (b), i.e., the formation of a compound of the formula V from a compound of the formula IV above, a compound of the formula IV is hydrogenated catalytically. Catalysts suitable for this purpose include palladium on carbon, platinum, nickel and cobalt, with palladium on carbon being the preferred catalyst. Such catalytic hydrogenation (that is to say, reduction) is effected in the presence of any suitable inert organic solvent medium. Representative of such inert organic solvent mediums are tetrahydrofuran, dimethylformamide, and lower alkanols such as, methyl alcohol, ethyl alcohol and the like. It is preferable when proceeding from a compound of the formula IV to a compound of the formula V, that the reaction be ended when the theoretical amount of hydrogen is absorbed. If the amount of hydrogen employed exceeds the theoretical amount, it is conceivable that competing side reactions can occur. Hence, in order to avoid this event and assure the highest yields possible, the preference to the use of theoretical amounts of hydrogen should become quite clear.

A compound of the formula V above can be converted into the corresponding compound of the formula I above by a wide variety of preparative techniques.

For example, as shown in step (c) in the Flow Sheet, a compound of the the formula V can be treated with a halo-lower alkanoyl-leaving group containing compound of the formula

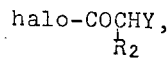

wherein $R_2$ is as described above and Y signifies halogen, lower alkyl sulfonyloxy and aryl sulfonyloxy or an anhydride of the formula

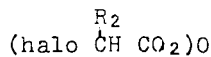

or of the formula (lower alkyl sulfonyl

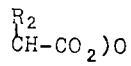

or of the formula (aryl sulfonyl

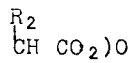

Representative of such anhydrides are chloroacetic anhydride, mesyloxyacetic anhydride, tosyloxyacetic anhydride and phenyl sulfonylacetic anhydride.

Suitable halo-lower alkanoyl halides, i.e., wherein Y in the formula above is halogen, are preferably represented by chloroacetyl chloride, bromoacetyl chloride, bromopropionyl chloride and the like. From the above, it should be evident that the halogen moieties of the above-identified halo-lower alkanoyl halide compound or the above-mentioned anhydrides are preferably selected from the group consisting of chlorine and bromine. It is advantageous that this step in the reaction sequence is effected in the presence of an acid acceptor, such as an inorganic or organic base. Suitably, bases which contain hydroxide ions such as an alkali hydroxide, e.g., sodium hydroxide, potassium hydroxide, can be used. Other bases are illustrated by sodium carbonate, triethylamine, pyridine and the like.

Representative of compounds of the formula

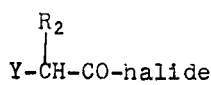

wherein Y is a lower alkyl sulfonyloxy or aryl-sulfonyloxy group are mesyloxyacetyl chloride and tosyloxyacetyl chloride.

Suitably this process aspect, i.e., the preparation of a compound of the formula VI wherein X is halogen, a lower alkyl sulfonyloxy or an aryl-sulfonyloxy, is effected in the presence of an inert organic solvent such as benzene, ether, methylene chloride and the like. Temperature and pressure are not critical to a successful performance of this process step. However, in a preferred aspect, this step is conducted below room temperature, e.g., at a temperature from about 0° to about 20°C.

It is important be bear in mind in the performance of this process step that the

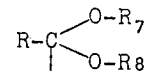

grouping evidences the propensity to be incompatible with moisture or alcohols under acidic conditions. In the presence of water and acids, it readily transforms to the lower alkanoyl grouping. Thus, these should be avoided along the reaction path in accordance with good scientific practices.

Following preparation of the compounds of formula IV wherein X is halogen, lower alkyl sulfonyloxy or aryl-sulfonyloxy group, the so-obtained compound may be treated with ammonia as shown in process step (d) in the Flow Sheet, and the resulting compound of the formula VII cyclized, without isolation, to the corresponding 1,4-benzodiazepin-2-one of the formula VIII.

The compound of the formula VII need not be isolated prior ty cyclizing same but the ring closure thereof to the compound of the formula VIII can be effected in the reaction medium in which the compound of the formula VII was prepared, without isolating same, or interrupting the reaction sequence before the desired compound of the formula VIII is obtained.

For example, the haloacylamido compound of the formula VI above or a tosyloxyacylamido compound of the formula VI above or a mesyloxyacylamido compound of the formula VI above can be placed in a lower alkanol solution of ammonia such as ethanolic ammonia or methanolic ammonia and, subsequently, after a period of several hours, for example, overnight, the corresponding 1,4- benzodiazepin-2-one represented by the formula VIII (e.g., wherein $R_7$ and $R_8$ together represent an ethylene group, a 7-(2-R-1,3-dioxolan-2-yl)benzodiazepin-2-one) can be recovered. The cyclization can be accelerated by heating.

In another embodiment, in lieu of methanolic ammonia, the compound of the formula VI wherein X is halogen, a lower alkyl sulfonyloxy group or an aryl-sulfonyloxy group can be dissolved in an inert organic solvent such as methylene chloride, carbon tetrachloride, ethers such as tetrahydrofuran, dioxane and ethyl ether, dimethylsulfoxide, dimethylformamide and the like and the resultant solution can be treated with liquid ammonia whereby a compound of the formula VII results. The so-obtained compound of the formula VII, either in crude or a more purified form, can be added to an inert organic solvent such as a lower alkanol, e.g., methanol, ethanol and the like. By permitting the resultant solution to stand and/or by the application of heat, cyclization to the corresponding compound of the formula VIII occurs.

In another preparative approach, compounds of the formula VI above wherein X is halogen other than iodine and bromine or when X is lower alkyl sulfonyloxy or aryl-sulfonyloxy can be converted into the corresponding compound of the formula VI above wherein X is iodo. This particularly efficacious when X is other than iodine or bromine. Suitably, this can be effected by treating the compound of the formula VI above wherein X is halogen other than iodine or bromine, or lower alkylsulfonyloxy or aryl-sulfonyloxy with an alkali metal iodide in an inert organic solvent. While sodium iodide is illustrated as the preferred iodine providing agent, it is, of course, to be understood that a myriad of other suitable agents would be readily recognized by those skilled in the art as usuable for this purpose. Preferably, the iodo compound is then treated with ammonia in the manner described above to obtain the desired compound of the formula VIII above.

Compounds of the formula VI or of the formula VIII above can be converted into the corresponding compound of the formula VI or VIII bearing an N-lower alkyl substituent by any suitable technique. For example, compounds of the formula VI or VIII can be treated with 1-alkali metal hydride, e.g., sodium hydride, or potassium t-butoxide and the like to form the corresponding N-alkali metal salt. The resulting alkali metal salt derivative can be thereafter with an alkylating agent such as methyl halide, e.g., methyl iodide, ethyl iodide, propyl iodide and the like or a dilower alkyl sulfate, e.g., dimethyl sulfate or diethylsulfate to form the N-lower alkyl derivative.

In a further aspect of this embodiment of the invention, compounds of the formula VI above wherein X is a phthalimido group can be obtained by treating a compound of the formula V above with a compound of the formula

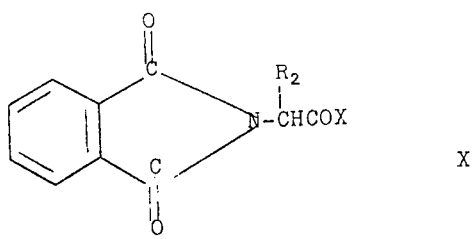

X wherein $R_2$ and X' are as above
in the presence of an alkaline halo acid binder. The condensation is carried out in a suitable inert solvent such as a halogenated hydrocarbon, e.g., chloroform and methylene chloride, pyridine and the like. It is preferred to effect this reaction at room temperature.

A compound of the formula VI above wherein X is phthalimido can also be obtained by treating the corresponding compound of the formula VI wherein X is halogen, lower alkyl sulfonyloxy and aryl sulfonyloxy, in a preferred aspect with an alkali metal salt of phthalimide (phthalimide potassium).

The so-obtained compound of the formula VI above wherein X is phthalimido can be converted into the corresponding compound of the formula VII treating the former with hydrazine hydrate. Suitably, this process is effected in an inert organic solvent. Preferably, one or more molar equivalents of hydrazine hydrate is present in the reaction zone for every one molar equivalent of compound of the formula VI wherein X is phthalimido. Temperature and pressure are not critical to a successful performance of this process step. However, elevated temperature is preferred. Also, for good yeilds it has been found that the reaction should be conducted in an inert organic solvent such as a lower alkanol, e.g. ethanol. In preceeding accordingly, the compound of the formula VII is obtained and it can be converted directly to the corresponding compound of the formula VIII without isolation of the said compound of the formula VII or interrupting the reaction before the desired benzodiazepin -2-one of the formula VIII is obtained.

In an alternate process step, a compound of the formula VI above wherein X is halogen or lower alkyl sulfonyloxy or an aryl sulfonyloxy group is treated with an azido-introducing reagent. Representative of azido group-providing agents are alkali metal azides, such as sodium azide, potassium axide, lithium azide and alkaline earth metal azides such as calcium azide, ammonia axide and the like. Preferred is sodium azide whereby to obtain the corresponding azide of the formula VI compound. In this process step, a compound of the formula VI is added to an appropriate organic solvent such as an alkanol, e.g., methanol, an ether such as dioxane and tetrahydrofuran and the like. The resultant solution is then gently heated whereby to obtain the azide compound. The so-obtained compound is then selectively reduced by catalytic hydrogenation utilizing any conveniently available catalyst such as, Raney nickel and noble metal catalysts such as palladium, platinum and the like, whereby to obtain the corresponding compound of the formula VII. The catalytic hydrogenation is suitably effected in the presence of an inert organic solvent such as an ether, e.g., tetrahydrofuran. In a preferred aspect the resulting compound of the formula VII is dissolved, without isolation from the reaction medium in which it is prepared, in an appropriate inert organic solvent such as ethanol, methanol and the like, and then cyclized to the corresponding compound of the formula VIII as described above.

In still another alternative process embodiment, the azide of the compound of the formula VI can be prepared directly from a compound of the formula V by reacting such compound with a compound of the formula

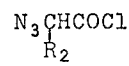

(e.g., azidoacetyl chloride) at a temperature from about 10°C. to about 50°C. in the presence of an inert organic solvent such as chloroform.

Compounds of the formula VIII above are converted readily into the corresponding compounds of the formula I above by any suitable readily available hydrolyzing technique conducted at a pH of below 7. In the most preferred embodiment, the hydrolysis of the compound of the formula VIII to the corresponding compound of the formula I is effected by simple solution in aqueous mineral acid. Inert organic solvents such as dimethylformamide, lower alkanols such as methanol, dimethylsulfoxide, ethers such as tetrahydrofuran and dioxane may be added as solubilizing agents. Temperature and pressure are not critical to a successful performance of this process step, but it is preferred to effect the reaction at a temperature range from about −10° to about 100°, most preferably, at about 10° to 30°, most advantageously at about room temperature. Suitably, in a most preferred embodiment as is noted above, the hydrolysis is effected in an aqueous solution of an acid, preferably a 3N to 12N acid. The acid agent can be provided by any suitable conveniently available technique such as the addition of the acid agent to a medium containing a compound of the formula VIII. Acid agents can be represented by mineral acids such as nitric acid, hydrochloric acid, aqueous hydrobromic acid, sulfuric acid and the like or an organic acid such as sulfonic acids, i.e., toluenesulfonic acid or methane sulfonic acid, trihaloacetic acids such as trifluoroacetic acid and other strong carboxylic acids such as oxalic acid. The particular acid agent utilized is not critical and can be selected by the artisan from the many he will readily recognize are suitable for the purposes of the present invention.

Compounds of the formula VIII can be reduced catalytically to the corresponding tetrahydro derivative thereof of the formula

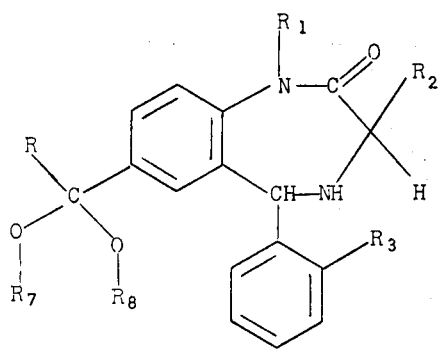

XI wherein R, R₁, R₂, R₃, R₇ and R₈ are as above with a suitable reducing system, e.g., hydrogenation in the presence of platinum, Raney nickel and the like. Suitably, this reaction is effected in the presence of an inert organic solvent such as alkanols, e.g. ethanol, methanol and the like, ethers such as diethyl ether, tetrahydrofurans and the like in accordance with usual procedures.

The compound of the formula XI can be converted into the compound of the formula

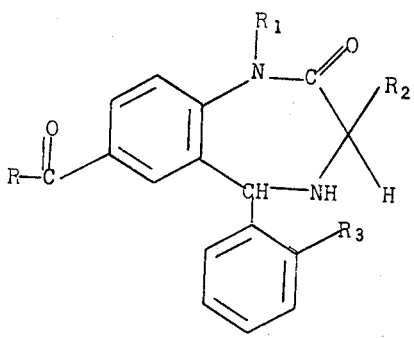

XII wherein R, R₁, R₂ and R₃ are as above utilizing the hydrolyzing procedures set forth fully hereinabove in connection with the conversion of a compound of the formula VIII into the corresponding compound of the formula I.

In the less preferred embodiment, a compound of the formula VIII or a compound of the formula XI can be dissolved in an aqueous medium such as an aqueous lower alkanoic acid, an aqueous lower alkanol medium, e.g., aqueous methanol, aqueous ethanol and the like. By heating the so-obtained medium at a temperature of from 40° to 100°, the respective conversion of a compound of the formula VIII or XI into the corresponding compound of the formula I or XII may be suitably effected.

In an alternate process aspect, compounds of the formula V above can be converted to the corresponding compound of the formula

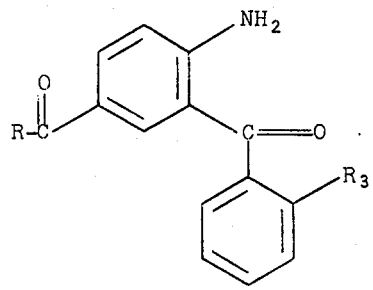

XIII wherein R and R₃ are as above by the hydrolysis procedure described in the immediately preceding paragraphs and the so-obtained 5-acetyl-2-amino benzophenone can be converted into the compounds of the formula I above in the manner more particularly set forth in co-pending application of Ning and Sternbach, Ser. No. 28,935 filed Apr. 15, 1970.

Compounds of the formula

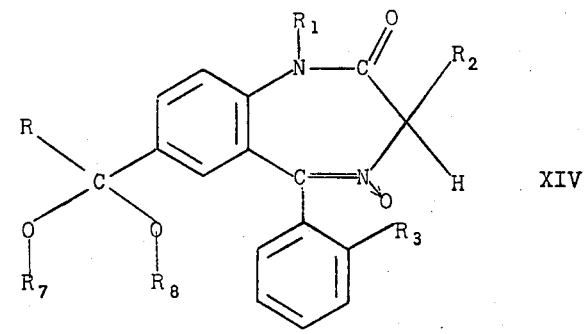

XIV wherein R, R₁, R₂, R₃, R₇ and R₈ are as above can be prepared from the corresponding compound of the formula VIII by treating the said compound of the formula VIII dispersed in an inert organic solvent with an oxidizing system capable of providing an N-oxide grouping. Among the suitable inert organic solvents, there can be includes halogenated hydrocarbons such as methylene chloride. As oxidizing agents, there can be utilized weak per-acid oxidizing agents such as chloroperbenzoic acid; peracetic acid and the like.

The so-obtained compounds of the formula XIV can be hydrolyzed to the corresponding compound of the formula

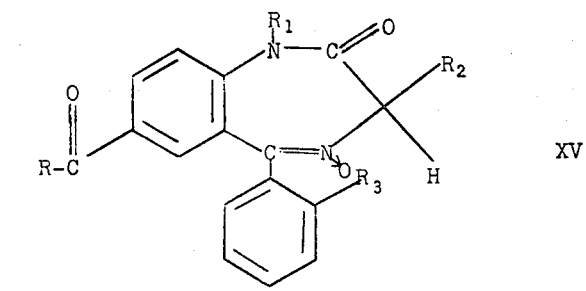

XV wherein R, $R_1$, $R_2$ and $R_3$ are as above in accordance with the procedure described above. If desired, the so-obtained compound of the formula XV can be converted into the corresponding compound of the formula I by removing the N-oxide group utilizing a hydrogenation technique, e.g. hydrogenation in the presence of a catalyst such as Raney nickel.

Compounds of the formula VIII, XI and XIV above, in addition to being novel intermediates useful in the preparation of compounds of pharmacological interest are also useful in and of themselves for biological purposes. For example, compounds of the formula VIII and XI above are useful as muscle relaxants, sedatives and anti-convulsants.

As is indicated above, compounds of the formula VIII, XIV and XI above are novel. The novel compounds of the formula VIII, XIV and XI can be embodied in pharmacological dosage formulations containing from about 0.5 mg. to about 200 mgs. Of active substance with dosage adjusted to species and individual requirements (parenteral formulations would ordinarily contain less of the active substance than compositions intended for oral administration). The compounds of the formula above can be administered alone or in combination with pharmaceutically acceptable carriers as indicated above in wide variety of dosage forms. For example, solid preparations for oral administration include tablets, capsules, powders granules, emulsions, suspensions and the like. The solid preparations may comprise an inorganic carrier, e.g., talc or an organic carrier, e.g., lactose and starch. Additives such as magnesium stearate (a lubricant) can also be included. Liquid preparation such as solutions, suspensions or emulsions may comprise the usual diluents such as water, petroleum jelly and the like, a suspension media such as polyoxyethylene glycols and the like. They may also contain other additional ingredients such as preserving agents, stabilizing agents and wetting agents.

The following examples are illustrative but not limitative of the present invention.

EXAMPLE 1

To a solution of 330 g. (20 moles) of p-nitroacetophenone in 2.5 ml. of benzene was added 160.0 g. (2.5 moles) of ethylene glycol and 5.0 g. of p-toluenesulfonic acid. The clear solution was heated to a reflux for 3 hrs. with a Dean-Stark trap until no more water separates. On cooling the cloudy benzene solution was decanted away from a small alcoholic layer and dried over anhydrous sodium sulfate. The solution was concentrated to about 1 l. and poured into 4 l. of hexane.

Colorless flakes were collected, washed with hexane yielding 2-methyl-2-(4-nitrophenyl)-1,3-dioxolane, m.p. 71°–73°.

Analytical sample was obtained as colorless flakes after recystallizations from methylene chloride hexane: m.p. 73°–74°.

EXAMPLE 2

To a room temperature solution of 100 g. (2.5 moles) of sodium hydroxide in 500 ml. of methanol was added 58.6 g. (0.50 mole) of phenyl acetonitrile, followed by 104 g. (0.50 mole) of 2-methyl-2-(4-nitrophenyl)-1,3-dioxolane. The reaction temperature rose to about 55° in the first 0.5 hr. of stirring. After 16 hrs. of vigorous stirring, 5-(2-methyl-1,3-dioxolan-2-yl)-3-phenyl-2,1-benzisoxazole was collected on a filter, and was washed thoroughly with water followed by small portions of cold methanol. The product was collected as a light yellow powder and was found to have a m.p. 137°–138°.

EXAMPLE 3

A solution of 2.81 g. (10 mmoles) of 5-(2-methyl-1,3-dioxolan -2-yl)-3-phenyl-2,1-benzisoxazole in 35 ml. of tetrahydrofuran containing 200 mg. of palladium on carbon was hydrogenated at 1 atmosphere and room temperature for 2 hrs.

The catalyst was removed by filtration. The filtrate was evaporated to dryness. The residual oil was crystallized from benzene-hexane to yield crude 2-amino-5-(2-methyl-1,3-dioxolan-2-yl)benzophenone as light yellow needles m.p. 97°–99°.

The crude material was further purified by chromatography on 50 g. of alumina (neutral Woeln activity I). Elution with 20 percent $Et_2O$: $CH_2Cl_2$ yielded 2-amino-5-(2-methyl-1,3-dioxolan-2-yl) benzophenone, m.p. 112°–114° as yellow prisms (methylene chloridehexane).

EXAMPLE 4

A mixture of 14.2 g. (50 mmol) of 2-amino-5-(2-methyl-1,3-dioxolan-2-yl)benzophenone, 10.4 g. (50 mmol) of chloroacetic anhydride and 150 ml. of benzene was kept at 5°C. overnight.

The benzene solution was washed with saturated $NaHCO_3$, and water, dried, evaporated to dryness, and the residue was crystallized from ethanol to yield 2'-benzoyl-2-chloro-4'-(2-methyl-1,3-dioxolan-2-yl)acetanilide, m.p. 131°–133° as colorless needles.

In a similar manner by reacting 2-amino-5-(2-methyl-1,3-dioxolan-2-yl)benzophenone with mesyloxyacetyl chloride, there can be obtained 2'-benzoyl-2-mesyloxy-4'-(2-methyl-1,3-dioxolan -2-yl)acetanilide.

Also, in a similar manner by reacting 2-amino-5-(2-methyl -1,3-dioxolan-2-yl)benzophenone with tosyloxyacetyl chloride, there can be obtained 2'-benzoyl-2-tosyloxy-4'-(2-methyl-1,3-dioxolan-2-yl)acetanilide.

EXAMPLE 5

A mixture of 14.00 g. (39.0 mmol) of 2'-benzoyl-2-chloro-4'-(2-methyl-1,3-dioxolan-2-yl(acetanilide, 11.6 g. (78.0 mmole) of sodium iodide, and 500 ml. of acetone was heated under reflux for 0.5 hr. On cooling the mixture was filtered, acetone was removed in vacuo, and the residue which was crude 2'-benzoyl-2-iodo-4'-(2-methyl-1,3-dioxolan-2-yl)acetanilide dissolved in 150 ml. of tetrahydrofuran was added to a 1,000 ml. three-necked flask equipped with a stirrer, a dry ice condenser and containing 400 ml. of liquid ammonia. The mixture was stirred under refluxing ammonia for 5 hrs., excess ammonia was allowed to evaporate overnight. The inorganic solids were removed by filtration. The tetrahydrofuran was evaporated in vacuo. The residual oil which contained crude 2'-benzoyl-2-amino-4'-(2-methyl-1,3-dioxolan-2-yl)acetanilide was dissolved in 200 ml. of ethanol and heated under reflux for 2 hrs. On cooling 1,3-dihydro-7-( 2-methyl-1,3-dioxolan-2-yl)-5-phenyl-2H-1,4- benzodiazepin-2-one crystallized, m.p. 250°–252°, as colorless prisms. The m.p. remained unchanged after recrystallization from ethanol.

EXAMPLE 6

A mixture of 2.0 g. (5.6 mmol) of 2'-benzoyl-2-chloro-4'-(2-methyl-1,3-dioxolan-2-yl(acetanilide, 1.68 g. (11.2 mmole) of sodium iodide, and 100 ml. of acetone was heated to reflux for 0.5 hr.

On cooling the insoluble inorganic salts were filtered. The filtrate was evaporated to dryness. The residue was then partitioned between $CH_2Cl_2$ and $H_2O$ and the organic layer was dried, evaporated to dryness and the residue obtained was crystallized from methanol to 2'-benzoyl-2-iodo-4'-(2-methyl-1,3-dioxolan-2-yl)acetanilide, m.p. 117°–119° as colorless prisms.

The prisms were dissolved in 150 ml. of tetrahydrofuran. The so-obtained solution was added to a 1,000 ml. three-necked flask equipped with a stirrer, a dry ice condenser and containing 400 ml. of liquid ammonia. The mixture was stirred under refluxing ammonia. For 5 hours, excess ammonia was allowed to evaporate overnight. The inorganic solids were removed by filtration. The tetrahydrofuran was evaporated in vacuo. The residual oil was dissolved in 200 ml. of ethanol and heated under reflux for 2 hours. On cooling 1,3-dihydro-7-(2-methyl-1,3-dioxolan-2-yl)-5-phenyl-2H-1,4-benzodiazepin-2-one crystallized, m.p. 250°–252° as colorless prisms.

EXAMPLE 7

A solution of 161 mg. (0.50 mmole) of 1,3-dihydro-7-(2-methyl-1,3-dioxolan-2-yl)-5-phenyl-2H-1,4-benzodiazepin-2-one in 1.5 ml. of 6N hydrochloric acid was allowed to stand at room temperature for about 3 min. The solution was diluted with 10 ml. of water and neutralized to pH 7–8 with aqueous potassium hydroxide. Extraction with methylene chloride gave, after crystallization from ether, 7-acetyl-1,3-dihydro-5-phenyl -2H-1,4-benzodiazepin-2-one as colorless prisms, m.p. 192°–193°.

In a similar manner as described in the above examples, 1,3-dihydro-5-phenyl-7-propionyl-2H-1,4-benzodiazepin-2-one (pale yellow prisms from ether, m.p. 172°–174.5°) can be prepared from 1,3-dihydro-7-(2-ethyl -1,3-dioxolan-2-yl)-5-phenyl-2H-1,4-benzodiazepin-2-one and; 7-butyryl-1,3-dihydro-5-phenyl-2H-1,4-benzodiazepin-2-one can be prepared from 1,3-dihydro-7-(2-propyl 1,3-dioxolan-2-yl)-5-phenyl-2H-1,4-benzodiazepin-2-one and; 1,3-dihydro-7-pentanoyl-5-phenyl-2H-1,4-benzodiazepin-2-one (m.p. 111°–112.5° from ether/pentane as pale yellow prisms) can to prepared from 1,3-dihydro-7-(2-butyl -1,3-dioxolan-2-yl)-5-phenyl-2H-1,4-benzodiazepin-2-one.

EXAMPLE 8

To a solution of 1.00 g. (3.54 mmol) of 2-amino-5-(2-methyl -1,3-dioxolan-2-yl)benzophenone in 30 ml. of ethanol, was added 14 ml. of 1M $HClO_4$. The mixture was stirred at room temperature overnight. The ethanol insolubles were collected. The filtrate was basified with 3N NaOH, partitioned between methylene chloride and water. The organic layer was dried, evaporated to dryness, and the residue combined with the ethanol insolubles and recrystallized from benzene-hexane to yield m.p. 152°–154°, of 2-amino-5-acetylbenzophenone as yellow needle clusters. By mixture m.p., and thin layer chromatography this product was found identical to 2-amino-5-acetyl benzophenone.

EXAMPLE 9

A solution of 1.18 g. (5.0 mmoles) of 5-acetyl-3-phenyl -2,1-benzisoxazole in 25 ml. of tetrahydrofuran was hydrogenated at 1 atmosphere in the presence of 200 mg. of 10 percent palladium on carbon catalyst. Hydrogen uptake was complete within 0.5 hr. The catalyst was removed by filtration. Evaporation of tetrahydrofuran followed by crystallization from benzene gave 5-acetyl-2-aminobenzophenone as yellow prisms, m.p. 153°–154°.

EXAMPLE 10

To a solution of 3.000 g. (9.30 mmol) of 1,3-dihydro-7-(2-methyl-1,3-dioxolan-2-yl)-5-phenyl-2H-1,4-benzodiazepin-2-one in 150 ml. of tetrahydrofuran was added 2.00 g. of $PtO_2$. The mixture was hydrogenated under 1 atmosphere of hydrogen for 8 hrs.

The catalyst was removed by filtration followed by washing with tetrahydrofuran. The filtrate was concentrated in vacuo. The residue was crystallized from $CH_3CN$ to give 7-(2-methyl-1,3-dioxolan-2-yl)-5-phenyl-1,3,4,5-tetrahydro-2H-1,4-benzodiazepin-2-one of colorless prisms, m.p. 181°–182°.

EXAMPLE 11

To a solution of 270 mg. (1.01 mmol) of 2-amino-5-(1,3-dioxolan-2-yl)benzophenone in 5.0 ml. of tetrahydrofuran was added 3.0 ml. of 6N HCl, and the mixtuue was allowed to stand at room temperature for 5 minutes.

The mixture was diluted with 15 ml. of $H_2O$, basified with 10 M KOH and extracted with $CH_2Cl_2$. The organic layer was dried, evaporated to dryness. The residue was crystallized and recrystallized to constant m.p. from benzene-hexane to give 2-amino-5-formyl -benzophenone, m.p. 134°–136° as yellow microprisms.

EXAMPLE 12

To a hot solution of 28.2 g. (0.10 mole) of 5-(2-methyl-1,3-dioxolan-2yl)-3-phenyl-2,1-benzisoxazole in 125 ml. of tetrahydrofuran on a steam bath, was added 50 ml. of aqueous 3N hydrochloric acid. The mixture was maintained at near boiling for 0.5 hr., then cooled, diluted with water and extracted with methylene chloride. Evaporation of methylene chloride followed by recrystallization from methanol gave 5-acetyl-3-phenyl-3,1-denzisoxazole as yellow stout needles, m.p. 108°–110°.

EXAMPLE 13

Solution of 847 mg. (2.60 mmoles) of 7-(2-methyl-1,3-dioxolan-2-yl)-5-phenyl-1,3,4,5-tetrahydro-2H-1,-4-benzodiazepin-2-one in 20 ml. of 3N aqueous hydrochloric acid was allowed to stand at room temperature for 10 min. After neutralization of the mixture with saturated aqueous sodium bicarbonate, 7-acetyl-5-phenyl-1,3,4,5-tetrahydro-2H-1,4-benzodiazepin-2-one was isolated by extraction with methylene chloride. This product, after crystallization from acetonitrile was found to have a m.p. 184°–186°.

EXAMPLE 14

To a stirred solution of 9.65 g. (30 mmoles) of 1,3-dihydro-7-(2-methyl-1,3-dioxolan-2-yl)-5-phenyl-2H-1,4-benzodiazepin-2-one in 150 ml. of methylene chloride was added 6.0 g. (30 mmoles) of 85 percent m-chloroperbenzoic acid. The mixture was stirred until a complete solution was obtained, then allowed to stand at room temperature for 24 hours. The mixture was concentrated to a small volume. The precipitated m-chlorobenzoic acid was removed by filtration. The filtrate was evaporated to dryness. Crude 1,3-dihydro-7-(2-methyl-1,3-dioxolan-2-yl)-5-phenyl-2H-1,4-benzodiazepin-2-one 4-oxide was dissolved in 50 ml. of tetrahydrofuran, then mixed with 30 ml. of 3N aqueous hydrochloric acid. The mixture was stirred at room temperature for 20 min., then neutralized with aqueous sodium hydroxide to pH 7, dilute with water and extracted with methylene chloride. The methylene chloride layer was washed with aqueous sodium bicarbonate solution, dried over anhydrous sodium sulfate and evaporated to a small volume. Slow addition of ether precipitated crude crystalline 7-acetyl-1,3-dihydro-5-phenyl-2H-1,4-benzodiazepin-2-one 4-oxide, m.p. 193°–195°. After purification by recrystallization from acetone, yellow needles were obtained, m.p. 208°–209°.

EXAMPLE 15

To 125 ml. of a chloroform solution of phthalimidoacetyl chloride, there was added 5 g. of 2-amino-5-(2-methyl-1,3-dioxolan-2-yl)benzophenone. After refluxing for 3 hours the reaction mixture was allowed to stand for 48 hours at room temperature. Removal of the solvent in vacuo left crystalline 5-(2-methyl-1,3-dioxolan-2-yl)-2-phthalimidoacetamido benzophenone.

A solution of 5-(2-methyl-1,3-dioxolan-2-yl)-2-phthalimido-acetamido benzophenone (0.5 gms.) in 95 percent ethanol (25 ml.) containing hydrazine hydrate (0.17 gms.) was heated under reflux for 2 hours. About 10 ml. of ethanol was then distilled off. The so-obtained reaction mixture which contained 2-glycylamino-5-(2-methyl-1,3-dioxolan-2-yl)benzophenone was cooled to room temperature and filtered. The filtrate was acidified by addition of 5 percent hydrochloric acid. The mixture was then warmed to about 80° for 0.5 hr. After so warming, the mixture was cooled so that the temperature was brought to about room temperature. The so-obtained mixture was made alkaline with dilute sodium hydroxide and exhaustively extracted with methylene chloride. The extract was washed with water, the solvent removed by distillation and the remaining 7-acetyl-1,3-dihydro-5-phenyl-2H1,4-benzodiazepin-2-one was recrystallized from benzene-petroleum ether as a pale yellow powder.

EXAMPLE 16

To a solution of 8.4 mmoles of 2'-benzoyl-2-chloro-4'-(2-methyl-1,3-dioxolan-2-yl)acetanilide in 120 ml. of methanol, was added 16.8 mmoles of sodium azide in one portion. The reaction mixture was heated on a steam bath for 15 min. The mixture was evaporated to dryness. The residue was partitioned between water and methylene chloride. The methylene chloride layer was washed with water, dried and evaporated. Crystallization of the residue from ethanol gave 2-azido-2'-benzoyl-4'-(2-methyl-1,3-dioxolan-2-yl)acetanilide.

In a similar manner, upon the treatment of 2'-benzoyl-2-mesyloxy-4'-(2-methyl-1,3-dioxolan-2-yl)acetanilide and 2'-benzoyl-2-tosyloxy-4'-(2-methyl-1,3-dioxolan-2-yl)acetanilide with sodium azide, there can be obtained 2-azido-2'-benzoyl-4'(2-methyl-1,3-dioxolan-2-yl)acetanilide.

To a solution of 6.2 mmoles of 2-azido-2'-benzoyl-4'-(2-methyl-1,3-dioxolan-2-yl)acetanilide in 125 ml. of tetrahydrofuran was added 350 mg. of 10 percent palladium on carbon. The mixture was hydrogenated at one atmosphere for 2 hr. and yielded 2-amino -2'-benzoyl-4'-(2-methyl-1,3-dioxolan-2-yl)acetanilide. The catalyst was removed by filtration through a pad of Celite, and the solution was evaporated to dryness. The pale yellow solid obtained was dissolved in 125 ml. of ethanol and heated to a reflux for 2 hrs. Concentration of ethanol gave 1,3-dihydro-7-(2-methyl-1,3-dioxolan-2-yl)-5-phenyl-2H-1,4-benzodiazepin-2-one as colorless prisms, m.p. 250°–252°.

EXAMPLE 17

To a stirring suspension of 1.61 g. (5.0 mmoles) of 1,3-dihydro-7-(2-methyl-1,3-dioxolan-2-yl)-5-phenyl-2H-1,4-benzodiazepin-2-one in 10 ml. of dry dimethylformamide under nitrogen was added 288 mg. (6mmoles) of a 50 percent oil stabilized sodium hydride in small portions over a period of 1 min. There was instant evolution of hydrogen. Within 10 min., the mixture became a gelatinous solid mass.

After 15 min., 0.50 ml. (8 mmoles) of methyl iodide was added in one portion. Within 10 min., all the solids dissolved. After 30 min., the mixture was poured into 100 ml. of ice-cold water and extracted with ether. The ether layer was washed with water, dried over anhydrous sodium sulfate and concentrated to a small volume. On chilling, 1,3-dihydro-1-methyl-7-(2-methyl-1,3-dioxolan-2-yl)-5-phenyl-2H-1,4-benzodiazepin-2-one crystallized, m.p. 122°–124°. Recrystallization from acetonehexane gave colorless prisms, m.p. 122°–124°.

EXAMPLE 18

A solution of 200 mg. (0.60 mmole) of 1,3-dihydro-1-methyl-7-(2-methyl-1,3-dioxolan-2-yl)-5-phenyl-2H-1,4-benzodiazepin-2-one in 1.5 ml. of 3N aqueous HCl was allowed to stand at room temperature for 10 min. The solution was diluted with water, neutralized to approximately pH 7 with aqueous sodium hydroxide, and extracted with methylene chloride. The methylene chloride layer was washed with water, dried over anhydrous sodium sulfate and evaporated to dryness. Addition of petroleum ether to the residue gave 110 mg. of essentially pure 7-acetyl-1,3-dihydro-1-methyl-5-phenyl-2H-1,4-benzodiazepin-2-one in a colorless, amorphous form. Recrystallization of the amorphous material from methylene chloride-ether-hexane gave colorless prisms, m.p. 120°–122°.

EXAMPLE 19

To a solution of 44.0 g. (1.10 mol) of NaOH in 200 ml. of methanol was added 26.00 g. (0.220 mol) of benzyl cyanide and 43.0 g. (0.220 mol) of p-nitrophenyl-1,3-dioxolane. The mixture was stirred vigorously for 0.5 hr. The solution turned deep purple initially followed by separation of silky yellow needles.

The needles were collected on a filter, washed with H₂O and MeOH. After recrystallization from methanol, gave 5-(-1,3-dioxolan-2-yl)-3-phenyl-2,1-benzisoxazole, m.p. 134°–135° as colorless needles.

EXAMPLE 20

A solution of 26.7 g. (0.10 mol) of 5-(1,3-dioxolan-2-yl)-3-phenyl-2,1-benzisoxazole in 350 ml. of tetrahydrofuran containing 2.00 g. of 10 percent palladium on carbon was hydrogenated at 1 atmosphere and room temperature for 1.5 hr.

The catalyst was removed by filtration. The filtrate was evaporated to dryness. The residue cyrstallized then was recrystallized to constant m.p. from benzene-hexane to yield 2-amino-5-(1,3-dioxolan-2-yl)benzophenone, m.p. 95°–97° as light yellow flakes.

EXAMPLE 21

A solution of 2.69 g. (10 mmol) of 2-amino-5-(1,3-dioxolan-2-yl)benzophenone, 2.08 g. (10 mmol) of chloroacetic anhydride in 30 ml. of benzene was kept at 5° overnight.

The mixture was washed with saturated aqueous NaHCO₃, and water; dried with anhydrous sodium sulfate, then evaporated to dryness. The residue was crystallized from ethanol to give 2'-benzoyl-2-chloro-4-(1,3-dioxolan-2-yl)acetanilide as colorless needles, m.p. 152°–153°.

EXAMPLE 22

A mixture of 5.2 g. (15.0 mmol) of 2'-benzoyl-2-chloro-4'-(1,3-dioxolan-2-yl)acetanilide, 4.45 g. (30 mmol) of NaI, and 250 ml. of acetone was heated under reflux for 0.5 hr.

The insoluble inorganic salts were removed by filtration. The filtrate was evaporated to dryness. The residue was crystallized from ethanol to constant m.p. to give 2'-benzoyl-4'-(1,3-dioxolan-2-yl)-2-iodo acetanilide, m.p. 110°–112° as colorless needles.

EXAMPLE 23

A solution of 5.0 g. (11.4 mmol) of 2'-benzoyl-4'-(1,3-dioxolan-2-yl)-2-iodoacetanilide in 50 ml. of tetrahydrofuran was added to 250 ml. of ammonia. The mixture was stirred under refluxing ammonia for 5 hrs. Excess ammonia was allowed to evaparate overnight whereby 2-amino-2'-benzoyl-4'-(1,3-dioxolan-2-yl)-acetanilide was obtained.

The tetrahydrofuran was removed in vacuo, and the residue was partitioned between CH₂Cl₂ and water. The CH₂Cl₂ layer was dried, evaporated to dryness and the residue was dissolved in 25 ml. of ethanol, warmed to a gentle reflux on a steam bath for 15 minutes. On cooling the ethanol solution gave 1,3-dihydro-7-(1,3-dioxolan-2-yl)-5-phenyl-2H-1,4-benzodiazepin-2-one, m.p. 153°–154° as light yellow prisms.

EXAMPLE 24

To a solution of 308 mg. (1 mmol) of 1,3-dihyhdro-7-(1,3-dioxolan-2-yl)-5-phenyl-2H-1,4-benzodiazepin-2-one in 5.0 ml. of tetrahydrofuran was added 30 ml. of 6N HCl. The mixture was stirred at room temperature for 15 min., neutralized to pH 6–7 with 10 M KOH, diluted to about 15 ml. with water, and extracted with CH₂Cl₂. The CH₂Cl₂ layer was dried, then evaporated to dryness. The residue was crystallized from benzene-hexane to give 1,3-dihydro-7-formyl-5-phenyl-2H-1,4-benzodiazepin-2-one, m.p. 159°–160° as yellow prisms.

EXAMPLE 25

A mixture of 1.24 g. (4.0 mmol) of 1,3-dihydro-7-(1,3-dioxolan-2-yl)-5-phenyl-2H-1,4-benzodiazepin-2-one, 240 mg. (5.0 mmol) of sodium hydroxide (~50 percent dispersion in oil), and 10 ml. of DMF was stirred in an ice bath for 5 minutes. Then 660 mg. (5.28 mmol) of dimethylsulfate was added and the mixture stirred for 15 minutes at 0°.

The mixture was added to 100 ml. of iced water, extracted with ether, dried, evaporated to dryness in vacuo. The residue on crystallization from ether-pentane gave 1,3-dihydro-7-(1,3-dioxolan-2-yl)-1-methyl-5-phenyl-3H-1,4-benzodiazepin-2-one, m.p. 138°–139° as yellow prisms.

EXAMPLE 26

A mixture of 350 mg. (1.08 mmol) of 1,3-dihydro-7-(1,3-dioxolan-2-yl)-1-methyl-5-phenyl-2H-1,4-benzodiazepin-2-one, 3.0 ml. of 6N HCl, and 5.0 ml. of THF was stirred at room temperature for 15 minutes. The mixture was neutralized to pH ≈ 7–8 with 10 M KOH, diluted with 10 ml. water, extracted with ether, dried, then evaporated to dryness. The residual yellow gum was purified by thick layer chromatography on a 20 × 20 × 2 cm silica gel plate, developed in ethyl acetate and eluted with 10 percent MeOH:EtOAc. Evaporated of the eluent in vacuo gave a yellow oil, which on crystallization from ether-pentane gave 1,3-dihydro-7-formyl-1-methyl-5-phenyl-2H-1,4-benzodiazepin-2-one, m.p. 123°–125° of a yellow amorphous powder.

We claim:
1. A compound of the formula

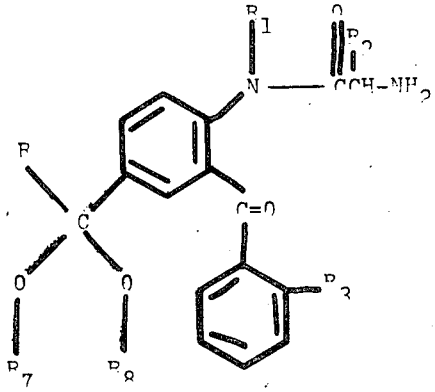

wherein R, R₁ and R₂ are each selected from the groups consisting of hydrogen and lower alkyl, R₃ is selected from the group consisting of hydrogen and halogen and R₇ and R₈ represent individually lower alkyl and when taken together represent the radical (CH₂)ₙ wherein n is a whole integer from 2–3.

2. A compound as in claim 1 wherein R₇ and R₈ when taken together represent the radical (CH₂)ₙ wherein n is a whole integer from 2–3.

3. A compound as in claim 2 of the formula 2'-benzoyl-2-amino-N-R₁-4'-(2-R-1,3-dioxolan-2-yl)acetanilide wherein R and R₁ are hydrogen or lower alkyl.

4. A compound as in claim 3 wherein R₁ is hydrogen and R is methyl.

5. A compound as in claim 3 wherein $R_1$ is methyl and R is methyl.

6. A compound of the formula

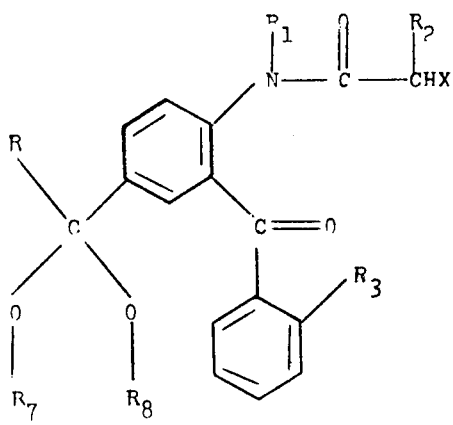

wherein R, $R_1$ and $R_2$ are each selected from the group consisting of hydrogen and lower alkyl, $R_3$ is selected from the group consisting of hydrogen and lower alkyl, $R_3$ is selected from the group consisting of hydrogen and halogen, $R_7$ and $R_8$ represent individually lower alkyl, and when taken together represent the radical $(CH_2)_n$ wherein n is a whole integer from 2–3 and X is selected from the group consisting of halogen, lower alkyl sulfonyl, aryl-sulfonyl, phthalimido or azido.

7. A compound as in claim 6 wherein $R_7$ and $R_8$ represent individually lower alkyl, and when taken together represent the radical $(CH_2)_n$ wherein n is a whole integer from 2–3.

8. A compound as in claim 7 wherein X is the halogen iodine.

* * * * *

UNITED STATES PATENT AND TRADEMARK OFFICE
CERTIFICATE OF CORRECTION

PATENT NO. : 3,900,501
DATED : August 19, 1975
INVENTOR(S) : ROBERT YE-FONG NING and LEO HENRYK STERNBACH It is certified that error appears in the above-identified patent and that said Letters Patent are hereby corrected as shown below:

Claim 6, column 20, lines 2-3, delete

"$R_3$ is selected from the group consisting of hydrogen and lower alkyl,"

Signed and Sealed this fifteenth Day of June 1976

[SEAL]

Attest:

RUTH C. MASON
*Attesting Officer*

C. MARSHALL DANN
*Commissioner of Patents and Trademarks*